United States Patent
Brown

(10) Patent No.: US 7,290,782 B2
(45) Date of Patent: Nov. 6, 2007

(54) TRAILER DOLLY

(76) Inventor: Wess A. Brown, 1244 Normal Ave., Chico, CA (US) 95928

( * ) Notice: Subject to any disclaimer, the term of this patent is extended or adjusted under 35 U.S.C. 154(b) by 204 days.

(21) Appl. No.: 11/021,684

(22) Filed: Dec. 21, 2004

(65) Prior Publication Data

US 2006/0170193 A1 Aug. 3, 2006

(51) Int. Cl.
 *B62B 1/00* (2006.01)
(52) U.S. Cl. .................. 280/476.1; 280/79.11
(58) Field of Classification Search ............ 280/476.1, 280/79.11, 511
 See application file for complete search history.

(56) References Cited

U.S. PATENT DOCUMENTS

| | | | | |
|---|---|---|---|---|
| 2,460,466 A | * | 2/1949 | Nogle .................. 280/476.1 |
| 3,145,857 A | * | 8/1964 | Hayman et al. ............ 414/563 |
| 3,179,196 A | * | 4/1965 | Richardson ................ 180/14.1 |
| 3,840,077 A | * | 10/1974 | Smith ..................... 172/258 |
| 4,491,338 A | * | 1/1985 | Sheldrake ............... 280/405.1 |
| 4,643,443 A | * | 2/1987 | Husa ...................... 280/491.1 |
| 4,799,698 A | * | 1/1989 | Markovic .................. 280/46 |
| 5,259,471 A | * | 11/1993 | Taylor et al. ............... 180/12 |
| 5,382,041 A | * | 1/1995 | Keith ..................... 280/476.1 |

* cited by examiner

*Primary Examiner*—Kevin Hurley
(74) *Attorney, Agent, or Firm*—Catherine Ashley Straight

(57) ABSTRACT

A trailer dolly comprising a horizontal base plate, a first pair of wheels which are fixed from rotation about a vertical axis, a second pair of wheels being rotatable around a vertical axis, and a trailer ball. The trailer dolly facilitates the loading of a trailer onto a tilt bed tow truck, including: a disabled trailer, such as a trailer with a broken or damaged axle, frozen wheel bearings, or collision damage to a wheel, axle or components thereof: and a trailer which is not fitted with a trailer jack having an attached dolly wheel. The trailer hitch ball of the trailer dolly is connected to a receiver of the trailer tongue, providing support, stability, and steerability, and allowing the trailer to be winched onto a tilt bed tow truck without damage to the trailer tongue, a trailer jack, and/or associated mechanism and wiring.

7 Claims, 3 Drawing Sheets

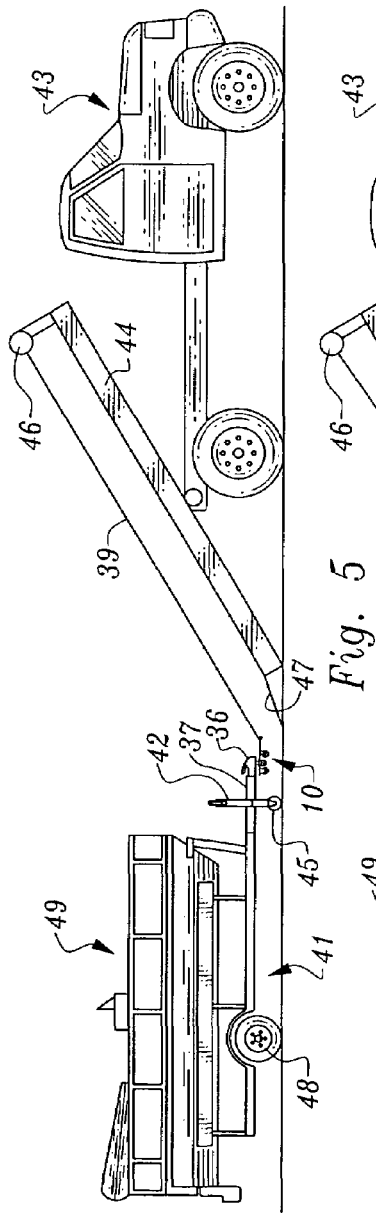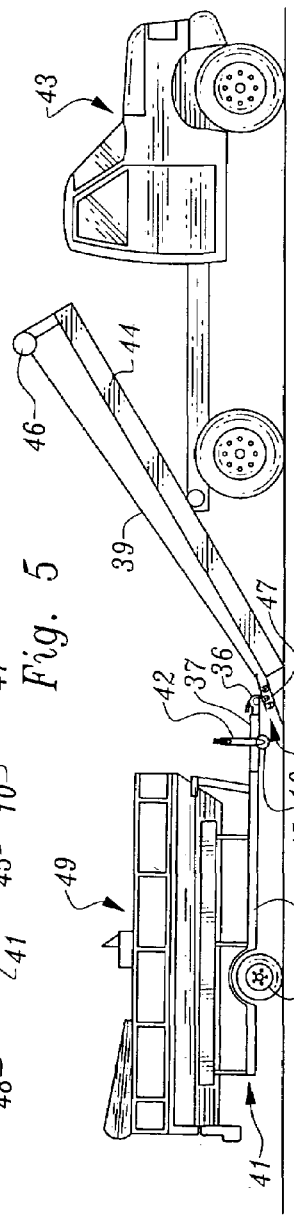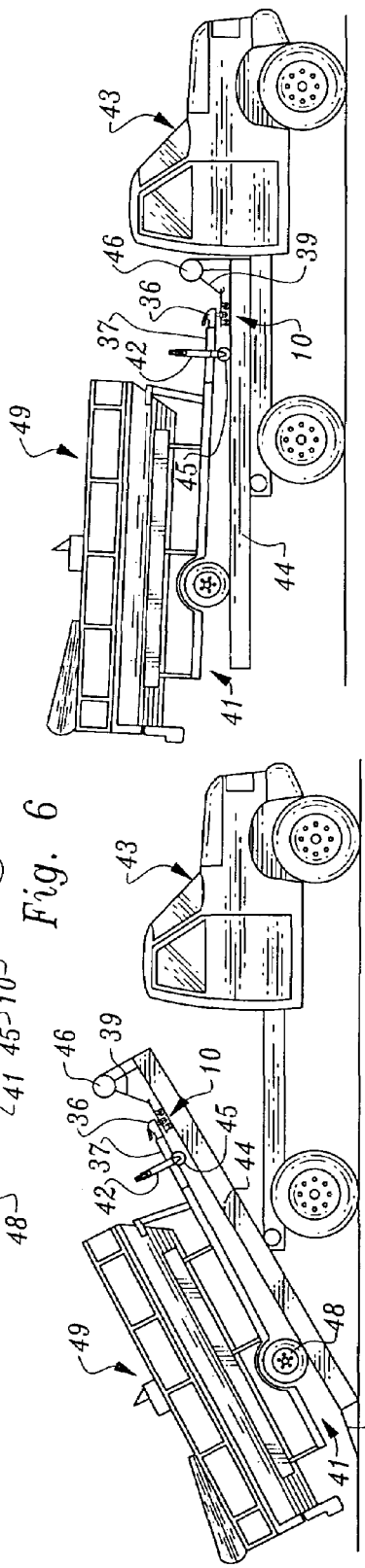
Fig. 5
Fig. 6
Fig. 7
Fig. 8

TRAILER DOLLY

BACKGROUND OF THE INVENTION

1. Field of the Invention

The invention relates generally to an apparatus designed to facilitate the loading and towing of a trailer, and in particular a disabled trailer, for example, a trailer with a broken or damaged axle, frozen wheel bearings, or collision damage to a wheel, axle or components thereof, or a trailer which is not fitted with a trailer jack having an attached wheel. More specifically, the invention pertains to a heavy duty dolly with two pairs of wheels mounted on the lower side of a base plate, employing a tow ball on the upper side which may be connected to a receiver of a trailer tongue, allowing the trailer to be winched onto a tilt bed tow truck without damage to the trailer tongue, a trailer jack, and/or associated mechanism and wiring.

2. Description of the Prior Art

Various trailer dollies and trailer hitch dollies been used for many years to move, or assist in the movement of, trailers. In particular, a trailer dolly may provide support for a trailer tongue during transit using a vehicle, or may allow a trailer to be moved manually. Features common to most trailers include at least one wheel and a means to connect a trailer to a towing vehicle, or to other means of towing a trailer.

Many of the trailer dollies used in connection with the common types of trailers are constructed to be connected to the tongue of a trailer and used when towing a trailer with a vehicle. In such case, use of a trailer dolly may provide additional support and/or stability, or absorb road shocks, during the towing of a trailer.

A House Trailer Dolly, shown in U.S. Pat. No. 2,596,655, issued to Converse, is typical of such a trailer dolly, wherein the trailer dolly facilitates the movement of a trailer around sharp curves and absorbs road shocks.

In some instances, the trailer dolly may provide a means for leveling a trailer, in addition to providing support and stability during towing.

The Trailer Dolly, shown in U.S. Pat. No. 2,469,152, issued to Brown, is representative of this type of trailer dolly.

Trailer dollies are also used to move a trailer manually, rather than towing the trailer with a vehicle. U.S. Pat. No. 3,189,365, for Portable Haulers, issued to Blacher, is an example of a manual device for pulling a boat or other trailer.

A dolly unit may also be connected to the bottom end of a trailer jack to facilitate manual movement of a trailer, or to provide support when the trailer is not coupled to a towing vehicle. The Trailer Tongue Dolly Unit, shown in U.S. Pat. No. 3,008,730, granted to Lisota, is an example of such a device.

All of these trailer dollies are designed to be used in the towing or moving of a trailer. It is recognized that the existing trailer dollies are designed generally to provide auxiliary support to the forward end or tongue of a trailer.

However, towing of a trailer requires that said trailer has functional wheels. A problem occurs with the movement of a trailer when one or more wheels or axles, or other components thereof, have been damaged. The trailer no longer rolls on its own wheels and becomes very difficult to move in either a forward or rearward direction. In such instance the disabled trailer cannot be towed and must be conveyed by other means, such as a tilt bed tow truck.

A problem occurs in loading the disabled trailer onto the tow truck. As indicated, the trailer no longer rolls on its own wheels, and further is no longer steerable. The disabled trailer must literally be dragged onto the bed of the tow truck. This is usually accomplished by connecting a hook and cable, or a chain, to the tongue or frame of the trailer, and pulling the trailer onto the tow truck bed by means of a winch or other device. In the process of pulling the trailer onto the truck bed, the trailer tongue, the trailer jack, and associated components and wiring, may be damaged.

The auxiliary support provided by a trailer jack fitted with a wheel is not sufficient to assist in loading a trailer with a damaged axle or wheels, and such jack and auxiliary wheel may also be damaged in the attempt to move the disabled trailer.

The present invention is directed toward addressing and solving the problem of loading a disabled trailer onto the bed of the tow truck without damaging the tongue of the trailer, the trailer jack, and any associated components and wiring. The present invention is further directed to solving the problem of assisting in the loading of a functional trailer which does not have a dolly wheel attached to the trailer jack, or one with a small dolly wheel which is insufficient to bear the weight of trailer being hauled up a ramp without sustaining damage to the trailer jack or attached dolly wheel.

SUMMARY OF THE INVENTION

The trailer dolly of the present invention includes a horizontal base plate, a first pair of wheels, a second pair of wheels, and a trailer ball.

The horizontal base plate has a forward end, a rearward end, an upper side, a lower side, and a fore and aft axis. The base plate includes a cable attachment means located on said axis at the forward end.

The first pair of wheels are mounted on the lower side of said base plate, adjacent said rearward end and adjacent said sides, on either side of said fore and aft axis. Said first pair of wheels being fixed from rotation about a first vertical axis and including wheels with an axis of rotation normal to said fore and aft axis.

The second pair of are mounted on said lower side of said base plate, adjacent said forward end and adjacent said sides on either side of said fore and aft axis. Said second pair of wheels being rotatable about a second vertical axis.

The trailer ball is mounted on the upper side of said base plate, on said fore and aft axis, intermediate said first pair of wheels and said second pair of wheels.

It is a principal object of the invention to provide support for a trailer tongue or front end of a trailer to assist in the loading of the trailer onto a tow truck. Another object of the invention is to provide support and ground clearance to prevent damage to the trailer tongue, trailer jack, and associated components and wiring.

A further object of the invention is to provide a rolling mechanism which is steerable to assist in positioning the trailer before and during the process of loading the trailer onto the tow truck. Said positioning is accomplished when the invention self-aligns due to the rotation about the second vertical axis of said second pair of wheels during the process of pulling the trailer onto the tow truck.

Still another object of the invention is to provide fore and aft stability during the process of loading the trailer onto the tow truck.

BRIEF DESCRIPTION OF THE DRAWINGS

FIG. 5 is a side elevational view, showing the trailer dolly attached to a trailer, with a cable hook and cable assembly attached to the forward end of the trailer dolly, the opposite end of the cable being attached to a winch mechanism of a tilt bed tow truck, with the truck bed in an angled position;

FIG. 6 is a side elevational view as in FIG. 5, but showing the support post of the trailer tongue in the retracted position, and the trailer beginning to be loaded on the tilt bed tow truck;

FIG. 7 is a side elevational view as in FIG. 6, but showing the trailer being pulled onto the bed of the truck; and FIG. 8 is a side elevational view as in FIG. 7, showing the trailer fully loaded, the trailer jack in the lowered position, and the tilt bed of the tow truck in the horizontal position.

DETAILED DESCRIPTION OF THE PREFERRED EMBODIMENT

Figure 1:
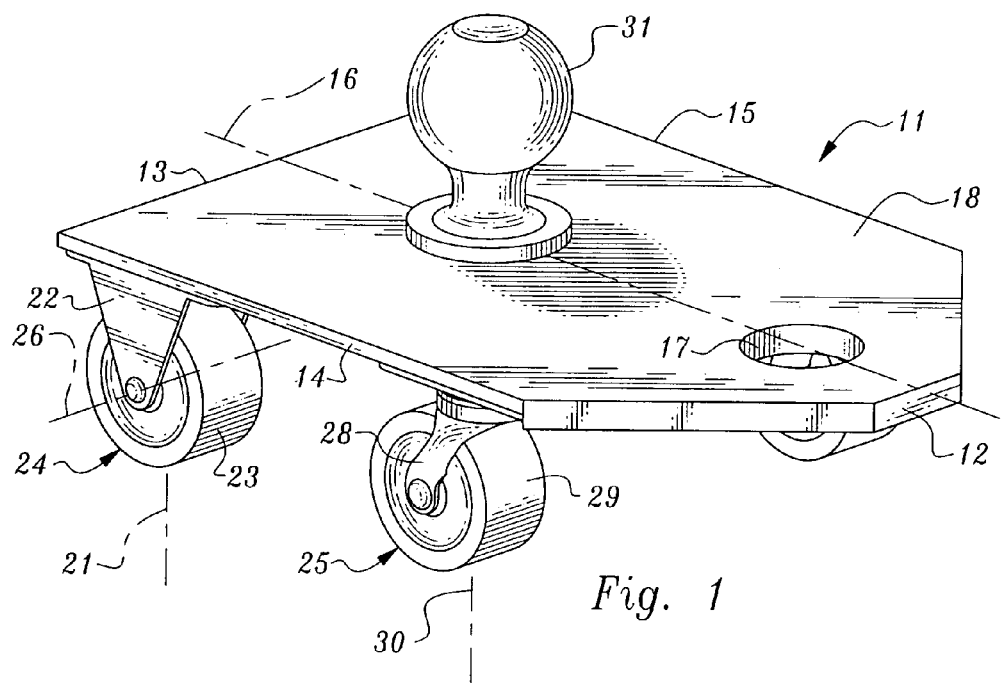
FIG. 1 is a right front perspective view of a trailer dolly of the present invention, identifying a fore and aft axis, a first and a second vertical axis, and an axis of rotation of a first pair of wheels.
Figure 2:
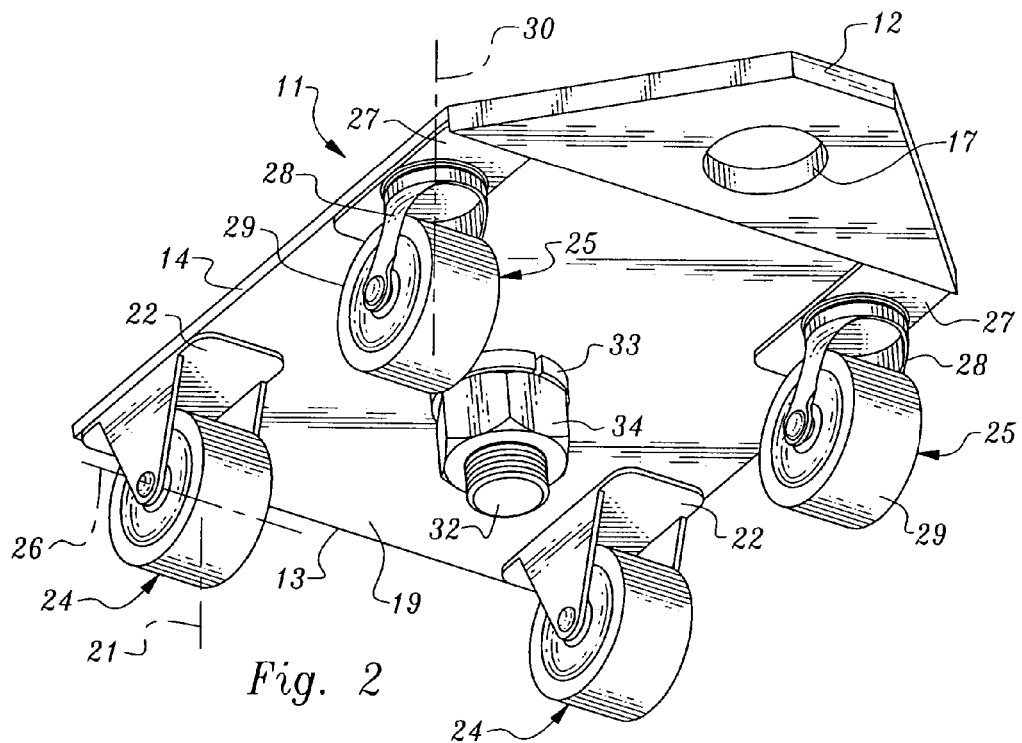
FIG. 2 is a right front perspective view taken from the under side, thereof.

Turning now to the drawings, and in particular to FIGS. 1 and 2, the trailer dolly 10 of the present invention generally comprises a horizontal base plate 11, a first pair of wheels 24, a second pair of wheels 25, and a trailer hitch ball 31 mounted on an upper side 18 of said base plate 11.

Figure 3:
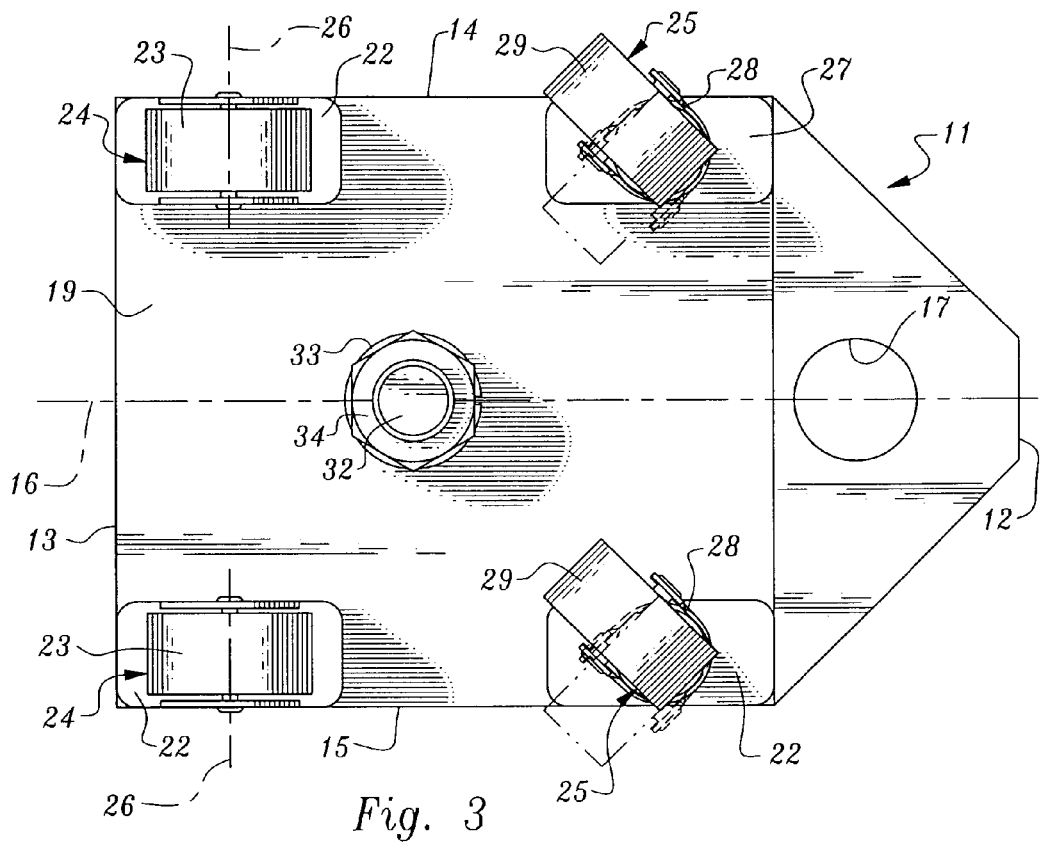
FIG. 3 is a bottom plan view showing the rotation about the second vertical axis of a second pair of wheels.

As illustrated in FIGS. 2 and 3, said first pair of wheels 24, are fixed from rotation about a first vertical axis 21 and having wheels 23 with an axis of rotation normal to said fore and aft axis 16. Said first pair of wheels 24 are mounted on a lower side 19 of said base plate 11, adjacent said rearward end 13 and adjacent said sides 14 and 15, respectively, on either side of said fore and aft axis 16. It will be appreciated that a fixed wheel mounting bracket 22 may be mounted by various means, including welding or bolting said mounting bracket 22 to said lower side 19 of saidbase plate 11.

As further illustrated in FIGS. 2 and 3, a second pair of wheels 25, being rotatable about a second vertical axis 30, are mounted on said lower side 19 of said base plate 11, adjacent said forward end 12 and adjacent said sides 14 and 15, respectively, on either side of said fore and aft axis 16. A swivel yoke 28 is representative of the various means available to provide a rotatable wheel 29. Having a second pair of wheels 25 at said forward end 12 results in said trailer dolly 10 being steerable, thereby providing steerability as well as fore and aft stability to said trailer. It will also be appreciated that a mounting plate 27 may be mounted by various means, including welding or bolting said mounting plate 27 to said lower side 19 of said base plate 11.

In FIGS. 2 and 3, said trailer hitch ball 31 illustrated in FIG. 1, is shown mounted on said base plate 11 on said fore and aft axis 16, intermediate said first pair of wheels 24 and said second pair of wheels 25, by means of a washer 33, and a nut 34 threadably secured onto a bolt 32. It will be appreciated that mounting said trailer hitch ball 31 by means of said bolt 32 and said nut 34 allows said trailer hitch ball 31 to be easily removed and replaced with ones of different sizes to fit the various sizes of a trailer hitch receiver 36 (shown in FIG. 4). The bolt 32, washer 33 and nut 34 means of securing said hitch ball 31 which is interchangeable is only one of such means available. Other means of removably securing said hitch ball 31 include: an internally threaded hitch ball 31, secured from the lower side 19 with a square-head or hex-head bolt; and a hitch ball 31 having a shaft with a hole through said shaft, said hole perpendicular to said shaft, through which a pin or cotter key may be passed. Other means may also used to mount said trailer hitch ball 31 to said base plate 11, such as welding, and a weld fillet 35 is shown in FIG. 4.

Figure 4:
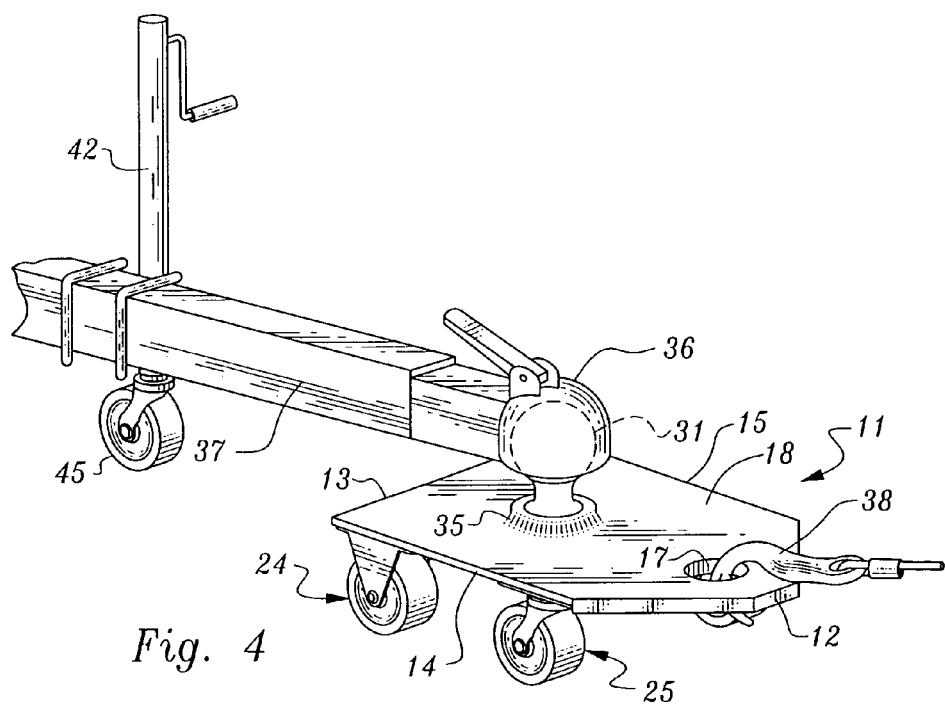
FIG. 4 is a right front perspective view as in FIG. 1, showing a cut away view of a trailer tongue with the trailer dolly coupled to a trailer hitch receiver, and with a cable hook attached to the trailer dolly through an aperture in the forward end of the trailer dolly.

In FIG. 4, a cut-away portion of a trailer tongue 37 is shown to illustrate the connection of said trailer dolly 10 to said trailer tongue 37 by means of securing said trailer hitch ball 31 within said trailer hitch receiver 36, and further attaching said cable hook 38 to said trailer dolly 10 by passing said cable hook 38 through said aperture 17 at said forward end 12 of said base plate 11. As shown in FIG. 4, a trailer jack 42 with attached dolly wheel 45 is in a raised position, and said trailer tongue 37 is completely supported by said trailer dolly 10, which is now also providing steerability.

The process of loading a trailer 41 (shown with a boat 49) onto a tow truck 43 having a tilt bed 44, using said trailer dolly 10 is illustrated in FIGS. 5, 6, 7 and 8. In the example provided in these Figures, said trailer 41 has functional wheels 48 and a trailer jack 42 with a small dolly wheel 45 attached. Said trailer jack 42 and dolly wheel 45 do not have the strength and stability required to haul said trailer 41 with boat 49 up the incline of said tilt bed 44. It will be appreciated that under the circumstance where said trailer wheel 48, or other wheel or axle component, has been damaged, said trailer jack 42 and said dolly wheel 45, not only lack sufficient strength, stability, and steerability, but also are likely to be seriously damaged in the loading process. In the situation would where said trailer 41 does not have a dolly wheel 45 attached to said trailer jack 42, said trailer dolly 10 is required to prevent dragging of the trailer tongue 37 during the loading process.

In FIG. 5, with said trailer jack 42 and its attached dolly wheel 45 in a lowered position, said trailer 41 with boat 49 has been attached to said trailer dolly 10 by connecting said trailer hitch receiver 36 to said trailer hitch ball 31. Said cable 39 has also been connected to said trailer dolly 10 by means of said cable hook 38 being hooked through said aperture 17 (as shown in FIG. 4). The end opposite of said cable hook 38 of said cable 39 being attached to a winch mechanism 46 of said tow truck 43 having said tilt bed 44 in an angled position and a loading ramp 47 lowered to ground level. Said trailer 41 with boat 49 is now in position to commence loading onto said tow truck 43.

FIG. 6 illustrates the commencement of the loading process with said trailer jack 42 and its attached dolly wheel 45 in a raised position, said trailer dolly 10 providing support, fore and aft stability, and steering for said trailer 41, as said trailer dolly 10 is beginning to be winched onto said ramp 47 of said tow truck 43.

In FIG. 7 the completion of the process of winching said trailer 41 with said boat 49 up the inclined tilt bed 44 of said tow truck 43 is illustrated. Said trailer jack 42 and its attached dolly wheel 45 are still in the raised position, and said trailer dolly 10 has provided all of the support, fore and aft stability, and steering required to guide said trailer 41 up said tilt bed 44 and load said trailer 41 onto said tow truck 43.

FIG. 8 shows said trailer 41 with boat 49, fully loaded onto said tow truck 43 and ready for transport, with said trailer jack 42 in the lowered position, said ramp 47 retracted, and said tilt bed 44 in the horizontal position.

What is claimed is:

1. A trailer dolly, comprising:
   a. a horizontal base plate, having a forward end, a rearward end, opposing sides, and a fore and aft axis, said forward end including cable attachment means located on said fore and aft axis;
   b. a first pair of wheels, said first pair being fixed from rotation about a first vertical axis and having an axis of rotation normal to said fore and aft axis, said first pair of wheels being mounted on a lower side of said base plate, adjacent said rearward end and adjacent said sides on either side of said axis fore and aft axis;
   c. a second pair of wheels, said second pair being rotatable about a second vertical axis, said second pair of wheels being mounted on said lower side of said base plate, adjacent said forward end and adjacent said sides on either side of said fore and aft axis; and,
   d. a trailer hitch ball, mounted on an upper side of said base plate, on said fore and aft axis, intermediate said first pair and said second pair of wheels.

2. A trailer dolly as in claim 1 in which said cable attachment means comprises an aperture sized to pass a cable hook.

3. A trailer dolly as in claim 1, in which said trailer hitch ball is bolted to said base plate.

4. A trailer dolly as in claim 1, in which said trailer hitch ball is welded to said base plate.

5. A trailer dolly as in claim 1 in which said base plate includes forward and inwardly angled portions on its forward end.

6. A trailer dolly, comprising:
   a. a horizontal base plate, having a forward end, a rearward end, opposing sides, and a fore and aft axis, said forward end including cable attachment means located on said fore and aft axis;
   b. a pair of fixed wheels, said fixed wheels being mounted on a lower side of said base plate, adjacent said rearward end and adjacent said sides on either side of said fore and aft axis, said fixed wheels having coincident axes of rotation normal to said fore and aft axis;
   c. a pair of rotatable wheels, said rotatable wheels being rotatable about a vertical axis, said rotatable casters being mounted on said lower side of said base plate, adjacent said forward end and adjacent said sides on either side of said fore and aft axis, said rotatable wheels having coincident axes of rotation normal to said fore and aft axis when said base plate travels along said axis, and having parallel axes of rotation when said base plate travels in a direction not coincident with said fore and aft axis; and,
   d. a trailer hitch ball, mounted on an upper side of said base plate, on said fore and aft axis, intermediate said pair of fixed wheels and said pair of rotatable wheels.

7. A trailer dolly, comprising:
   a. a horizontal base plate, having a forward end, a rearward end, opposing sides, and a fore and aft axis, said forward end including cable attachment means located on said fore and aft axis;
   b. two pairs of wheels, at least one of which said pairs of wheels is fixed from rotation about a vertical axis and having an axis of rotation normal to said fore and aft axis, one of such pairs of wheels being mounted on a lower side of said base plate adjacent said rearward end and adjacent said sides on either side of said fore and aft axis, and the other of said pair of wheels being mounted on said lower side of said base plate, adjacent said forward end and adjacent said sides on either side of said fore and aft axis; and,
   d. a trailer hitch ball, mounted on an upper side of said base plate, on said fore and aft axis, intermediate said two pairs of wheels.

* * * * *